March 16, 1954  E. B. HANSELL  2,672,067
ELECTROMECHANICAL CONTROLLING AND COUNTING SYSTEM
Filed Feb. 2, 1950  4 Sheets-Sheet 1

INVENTOR.
ERIK B. HANSELL
BY
*J. Jordan Kunik*
Attorney

March 16, 1954 E. B. HANSELL 2,672,067
ELECTROMECHANICAL CONTROLLING AND COUNTING SYSTEM
Filed Feb. 2, 1950 4 Sheets-Sheet 2

INVENTOR.
ERIK B. HANSELL

March 16, 1954  E. B. HANSELL  2,672,067
ELECTROMECHANICAL CONTROLLING AND COUNTING SYSTEM
Filed Feb. 2, 1950  4 Sheets-Sheet 3

INVENTOR
ERIK B. HANSELL
BY
Jordan Kwick
ATTORNEY

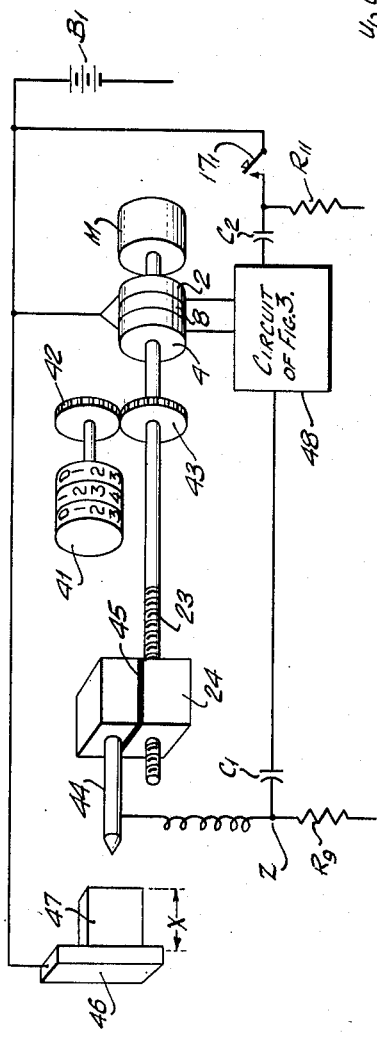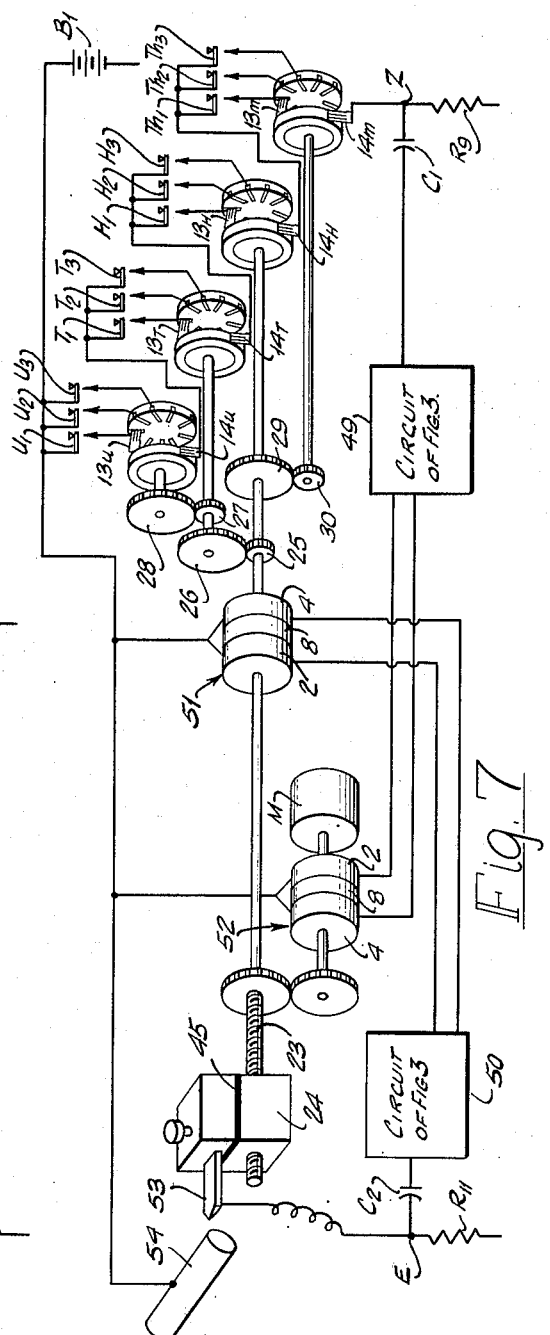

Patented Mar. 16, 1954

2,672,067

UNITED STATES PATENT OFFICE 2,672,067

ELECTROMECHANICAL CONTROLLING AND COUNTING SYSTEM

Erik B. Hansell, East Hartford, Conn.; Marjorie B. Hansell, administratrix of said Erik B. Hansell, deceased Application February 2, 1950, Serial No. 141,920

13 Claims. (Cl. 82—24)

1

This invention relates to electromechanical pulse counting and controlling systems consisting generally of pulse responsive circuits in conjunction with mechanical counters to be utilized for the automatic counting of pulses, machine control, gauge measurement and the like.

An object of my invention is to provide an electromechanical system comprising a start-stop pulse circuit in conjunction with a magnetic clutch for controlling rotational movement of a shaft.

A further object of my invention is to provide an electromechanical system which is adapted to receive pulses at a regular or irregular rate and at the end of a desired counting period to provide a direct reading total of said pulses on a conventional counter.

Another object of my invention is to provide a control system for various machine operations where, for instance, it is desired automatically to control the precise measurement through which a tool is to pass in making a particular cut on an object to be formed.

A still further object of the present invention is to provide an electromechanical system which will perform as a gauge or the like and simultaneously give a readily visible direct reading of the dimension of an object.

The essential features of my invention comprise constant speed electric motor, a magnetic clutch coupled to and driven by said motor and a start-stop pulse counting system comprising switches and commutators arranged in a novel combination with said motor and clutch.

Other objects of the invention will be apparent from the following description and accompanying drawings taken in connection with the appended claims. However, I desire to have it distinctly understood that I do not intend to limit myself to the exact details shown or described, but that I intend to include as part of my invention all such obvious changes and modifications of parts as would occur to a person skilled in this art, as fall within the scope of the claims.

In the drawings:

Fig. 4 is a portion of Fig. 3 showing how several groups of commutator sections may be used in a cascaded manner to make the armature stop virtually anywhere, for machine control purposes and the like;

Fig. 5 shows how the invention may be used as a high speed electromechanical counter;

Fig. 6 shows an embodiment of the invention in the form of a gauge; and

Fig. 7 shows another modification of the system illustrated in Fig. 5.

Figure 1:
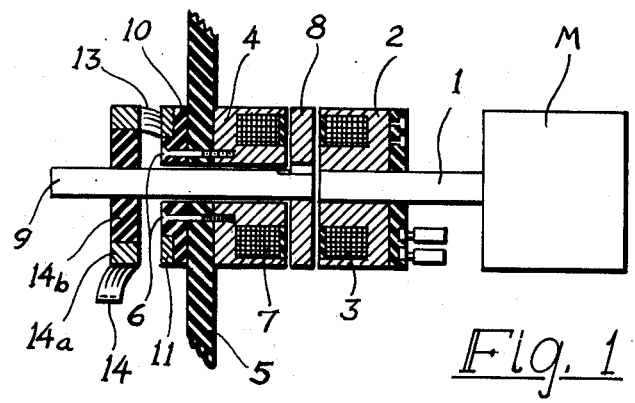
Fig. 1 shows the structural details of the mechanical portion of the clutch assembly partly in cross-section.

Referring to the drawings in detail, Fig. 1 shows the basic clutch arrangement. It consists of two magnetic yokes placed on each side of an armature. Of these yokes, one rotates while the other remains stationary. If the rotating yoke is energized, then the armature is attracted to it and also rotates; but if the stationary yoke is energized (first yoke being de-energized) then the armature is attracted in the opposite direction and locked in a stationary position. This action is roughly portrayed in Fig. 2 where a mechanical toggle switch or relay activates either one side or the other, but never both together.

Figure 2:
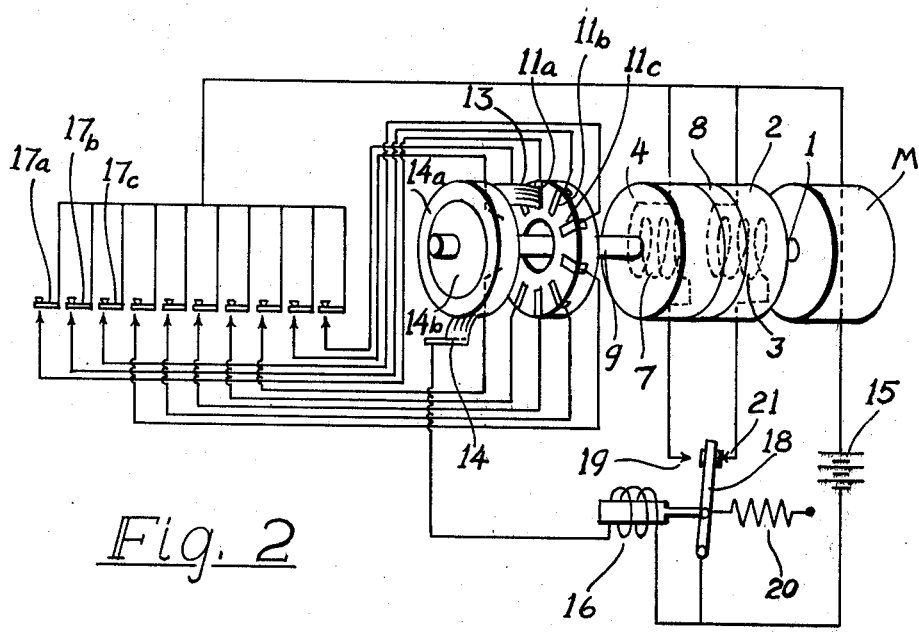
Fig. 2 is a diagrammatic view of one form of the invention.

Referring to Figs. 1 and 2 in more specific detail the basic clutch and circuit arrangement includes a rotatable shaft 1 driven by a suitable motor M. Fastened to shaft 1 is a magnetic yoke 2 which rotates with shaft 1, said yoke 2 being energizable by coil 3.

Another magnetic yoke 4 is positioned opposite yoke 2 and is fastened in a stationary position to bracket 5 by means of screws 6. Yoke 4 contains an energizing coil 7. Positioned between yokes 2 and 4 is armature 8 which is coupled to splined shaft 9 by means of a key whereby shaft 9 rotates when armature 8 rotates. Armature 8 is permitted by the spline and key arrangement to shift freely in an axial direction toward one yoke or the other depending upon which yoke is magnetized by energization of its respective coil. Secured to bracket 5 by screws 6 is a block 10 of insulating material in which contact segments 11 are embedded. Shaft 9 rotates free within an aperture in the center of yoke 4, bracket 5 and block 10.

Attached to the shaft 9, but electrically isolated by insulator 14b, is a brush 13 that wipes around over contact segments 11a, 11b, etc. embedded in a circular arrangement in block 10. A brush 14 brings current to the wiping brush 13 through conducting ring 14a from a current source 15 through solenoid 16. Conducting ring 14a is carried by and insulated from shaft 9 by non-conducting ring 14b. Each segment 11a, 11b, etc., is connected to a corresponding switch 17a, 17b, etc., respectively, whose common terminal is attached to the high end of the current source 15.

An electromagnetic relay comprising solenoid 16 and arm 18 is arranged to energized coil 7 of stationary yoke 4 through contact 19. This locks the armature 8 and in turn shaft 9 in a stationary posiiton. As soon as the solenoid 16 is inoperative a spring 20 pulls arm 18 to the right to impinge on contact 21 and energizes coil 3 of yoke 2 thereby causing armature 8 and shaft 9 to lock in a rotating condition in synchronism with shaft 1 which is continuously rotated by motor M at a constant predetermined speed.

Normally arm 18 is in the right position under the holding power of spring 20. This energizes yoke 2 so that both the armature 8 and shaft 9 rotate. Now if one of the switches 17 is depressed, such as 17a, the armature will continue to rotate until the wiping brush reaches the corresponding segment 11a. The circuit to the solenoid 16 is now closed, which causes the arm 18 to pull to the left. The armature 8 and shaft 9 are now locked in a stationary position against energized yoke 4. The armature 8 and shaft 9 will again rotate the instant that the switch 18 is released. Thus, it will be seen that the shaft can be made to stop at any of the segment positions at will.

Figure 3:
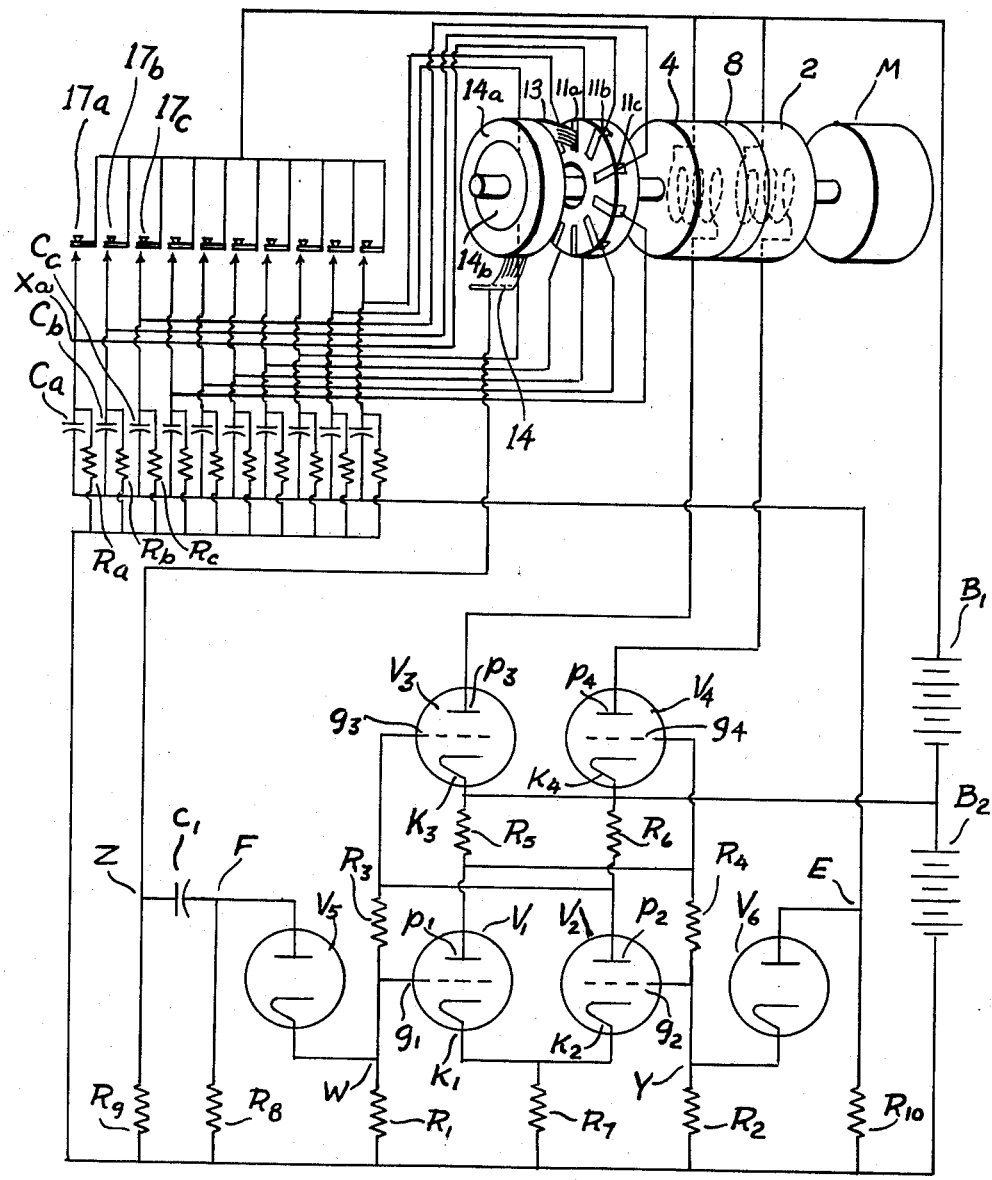
Fig. 3 is an elaboration of Fig. 2 by the addition of certain electronic circuits that operate by electric pulses.

Referring to Fig. 3, it is seen that the switching mechanism represented by the solenoid 16 and switch 18 have now been replaced by a flip-flop circuit that is triggered by pulses. Thus, when tube $V_1$ is triggered on by a positive pulse coming in at grid $g_1$, tube $V_2$ is extinguished. This energizes yoke 4 and deenergizes yoke 2 so that the shaft 9 and armature 8 become locked in a stationary position. If a positive pulse should come in at grid $g_2$ instead, then the reverse would happen. Tube $V_2$ would trigger on and tube $V_1$ would trigger off. In this case the armature 8 and shaft 9 would be locked to yoke 2 in a rotating condition.

Tubes $V_3$ and $V_4$ are D. C. amplifiers to convert the weak signals of the flip-flop tubes, $V_1$ and $V_2$, into currents sufficiently strong to energize the magnetic yokes. They derive their control signals from the control signals appearing across the load resistors $R_5$ and $R_6$ of the flip-flop tubes. When $V_1$ is conducting, for example, a negative voltage appears across $R_5$ and therefore on grid $g_4$ of tube $V_4$ which is therefore biased beyond cut-off. This leaves the yoke 2 deenergized. On the other hand, if $V_1$ is not conducting, the load resistor $R_5$ would have no voltage drop and tube $V_4$ would pass current to the yoke 2, thus energizing it.

Unless correct pulses are already available for starting and stopping armature 8, pulse forming networks are needed. When any one of the segment switches, such as 17a, is depressed, a square pulse appears across resistor $R_a$ whose width is equal to the time the switch is closed. Since this point must be tied to the grid circuit through the condenser $C_a$ for D. C. isolation, the square wave will be differentiated at point E with a narrow positive pulse and a narrow negative pulse. By passing this pair of pulses through the rectifier tube $V_6$, the negative portion is clipped and only the positive component remains as shown at Y. This becomes the starting pulse when applied to the grid $g_2$ of tube $V_2$. In a similar manner, it has been found desirable to have a pulse forming network on the other side of the flip-flop, i. e. to form the stopping pulse. Therefore, if switch 17a is kept depressed until the wiper brush 13 comes around to the segment 11a, then a square wave will be generated at point Z. This is differentiated by condenser $C_1$ and clipped by diode $V_5$ exactly as above. The result is a stop pulse applied to $g_1$.

In the following brief description on the operation of the flip-flop tubes it is assumed that tube $V_1$ is initially conducting and tube $V_2$ nonconducting. A positive pulse comes in at Y and strikes grid $g_2$ of tube $V_2$. This starts conduction of the tube which in turn disrupts a state of equilibrium. This happens because the plate $p_2$ reduces in voltage which transfers as a negative voltage through $R_3$ to the grid $g_1$ of tube $V_1$. This tube in turn begins to shut off. Its plate $p_1$ increases in voltage which is transferred through $R_4$ to grid $g_2$ of tube $V_2$ as a positive potential. The latter tube conducts even more now. This series of events is cumulative until with a final surge tube $V_1$ is completely extinguished and tube $V_2$ completely conducting. This condition is stable and remains so until a positive pulse appears at W (on grid $g_1$ of $V_1$) which starts the sequence of events all over again, but in a reversed sense. It is now obvious that current passes through one tube or the other, but never both, depending on which tube received the last positive pulse.

Other components shown in Fig. 3 include battery $B_1$ which serves as a power source for coils 3 and 7 and tubes $V_3$ and $V_4$ and battery $B_2$ which serves as a power source for tubes $V_1$ and $V_2$. Resistor $R_8$ and condenser $C_1$ form a differentiating circuit for the stop pulse while the respective banks of condensers $C_a$, $C_b$, etc., in combination with resistor $R_{10}$ form differentiating circuits for start pulses. Input resistor $R_9$ is provided for the stop pulse differentiating circuit and the group of resistors $R_a$, $R_b$, etc., serve as input resistors for the start pulse differentiating circuits. Resistors $R_1$ and $R_2$ are provided for the grid return circuits for tubes $V_1$ and $V_2$ respectively. Cathode bias resistor $R_7$ serves the cathodes of both tubes $V_1$ and $V_2$. Resistor $R_3$ provides feedback from tube $V_2$ to tube $V_1$ while resistor $R_4$ provides feedback from tube $V_1$ to tube $V_2$. Resistors $R_5$ and $R_6$ serve as load resistors for tubes $V_1$ and $V_2$ respectively.

Throughout this discussion only positive pulses have been discussed. Negative pulses may also be used with some slight change in circuitry. It must be borne in mind, however, that whereas a positive pulse will start a tube conducting, a negative pulse will extinguish it. Therefore, in order to retain the same sequence of events of the flip-flop, a negative pulse must be impressed upon the opposite tube from that needed with a positive pulse. Also the same tube may be used for both on and off by simply impressing a positive pulse and a negative pulse on the same grid.

Before any of the keys 17a, 17b, etc., are depressed it is assumed that normal conditions are prevailing. These are that the yoke 2 (and with it coil 3) are rotating with the shaft 1 by means of motor M. At the same time, yoke 4 (and with it coil 7) remain motionless. Armature 8 is also stationary because it is locked against yoke 4 which at the moment is excited magnetically. It is understood that the two yokes 2 and 4 and the armature 8 are all made of a metal having high magnetic permeability.

Let us assume that key 17a is depressed and kept there momentarily. A positive wave appears at point $X_a$ whose width is equal to the length of time the key is kept closed. This wave, after passing through the combined network of condenser $C_a$ and resistor $R_{10}$ is differentiated so that it appears at E as two narrow and separate pulses: a positive pulse for the down stroke of key $17a$, and a negative pulse for the release stroke of key $17a$. These pulses are then passed through the rectifier $V_6$ where the negative pulse is clipped off, thereby leaving only the positive pulse to go on to the grid $g2$ of tube $V_2$. This causes tube $V_2$ to turn on and tube $V_1$ to turn off as described heretofore. As $V_2$ goes on, current is drawn through resistor $R_6$ which causes the potential at $P_2$ to appear much lower than the cathodes $K_3$ and $K_4$ which are connected together. Since grid $g3$ is tied to plate $P_2$, it too must be lower in potential than the cathodes $K_3$ and $K_4$. This shuts off tube $V_3$ and therefore deenergizes magnetic yoke 4. Conversely, as tube $V_1$ shuts off, plate $P_1$ appears at the same potential as cathodes $K_3$ and $K_4$. Since grid $g4$ is tied to $P_1$, it too will have the same potential. This causes tube $V_4$ to turn on and consequently causes yoke 2 to energize. The armature 8 which was previously attached to yoke 4 is now released and locked onto the rotating yoke 2. The rotating armature now turns shaft 9 and brush 13.

The rotation of shaft 9 continues until brush 13 wipes across the brush segment $11a$ which is tied to the key $17a$ under consideration. A positive current flows from the battery $B_1$, through the key $17a$, through contact $11a$, through brush 13, through brush 14, and on to point Z where a square wave appears whose width is equal to the contact duration of the brush 13 against segment $11a$. Again as in the case of the starting pulse, this square wave passes through the differentiating network of condenser $C_1$ and resistor $R_8$ thereby causing a sharp positive pulse to appear at point F at the moment brush 13 hits segment $11a$ and a sharp negative pulse at the moment the brush leaves the segment. These pulses are then passed through the rectifier $V_5$ where the negative pulse is clipped off, thereby leaving only the positive pulse to go on to the grid $g1$ of tube $V_1$. This causes tube $V_1$ to turn on and tube $V_2$ to turn off as in the previous case. The armature 8 and shaft 9 have now stopped at a relative position that corresponds to the last key pressed ($17a$ in this case).

It should be noted at this point that even if the key $17a$ had been released before the arrival of brush 13 to the contact segment $11a$ a positive wave would still appear at point Z. The reason for this is that while the key is depressed, condenser $C_a$ has time to charge up by a current coming from battery source $B_1$. When the key $17a$ is released, the condenser holds its charge until the brush 13 comes around to segment $11a$. At this point, the condenser discharges to form an equivalent positive wave at point Z.

When another key, such as $17c$, is depressed, a starting pulse is generated as before and appears at grid $g2$ of tube $V_2$. Again yoke 2 is energized and yoke 4 deenergized. This causes the armature 8 and shaft 9 to rotate until the brush 13 wipes across contact segment $11c$. As before, a stopping pulse is generated that appears at $g1$ of tube $V_1$. This deenergizes yoke 2 and energizes yoke 4 so that the armature 8 and shaft 9 lock themselves in a standing position. If we assume ten stop positions around the periphery, the armature and shaft will have progressed 2/5 of a revolution beyond the first case.

It must be remarked here that although a specialized flip-flop circuit has been shown in this description (tubes $V_1$ and $V_2$), other types of flip-flop or trigger circuits well known in the art can equally well be substituted. As an example, a common form of flip-flop is one that uses a pair of thyratron tubes connected in such a way that when a pulse triggers one of the tubes, the other one is forced to extinction by causing the voltage across the tube to go below the region where conduction is sustained.

Figures 4, 5:
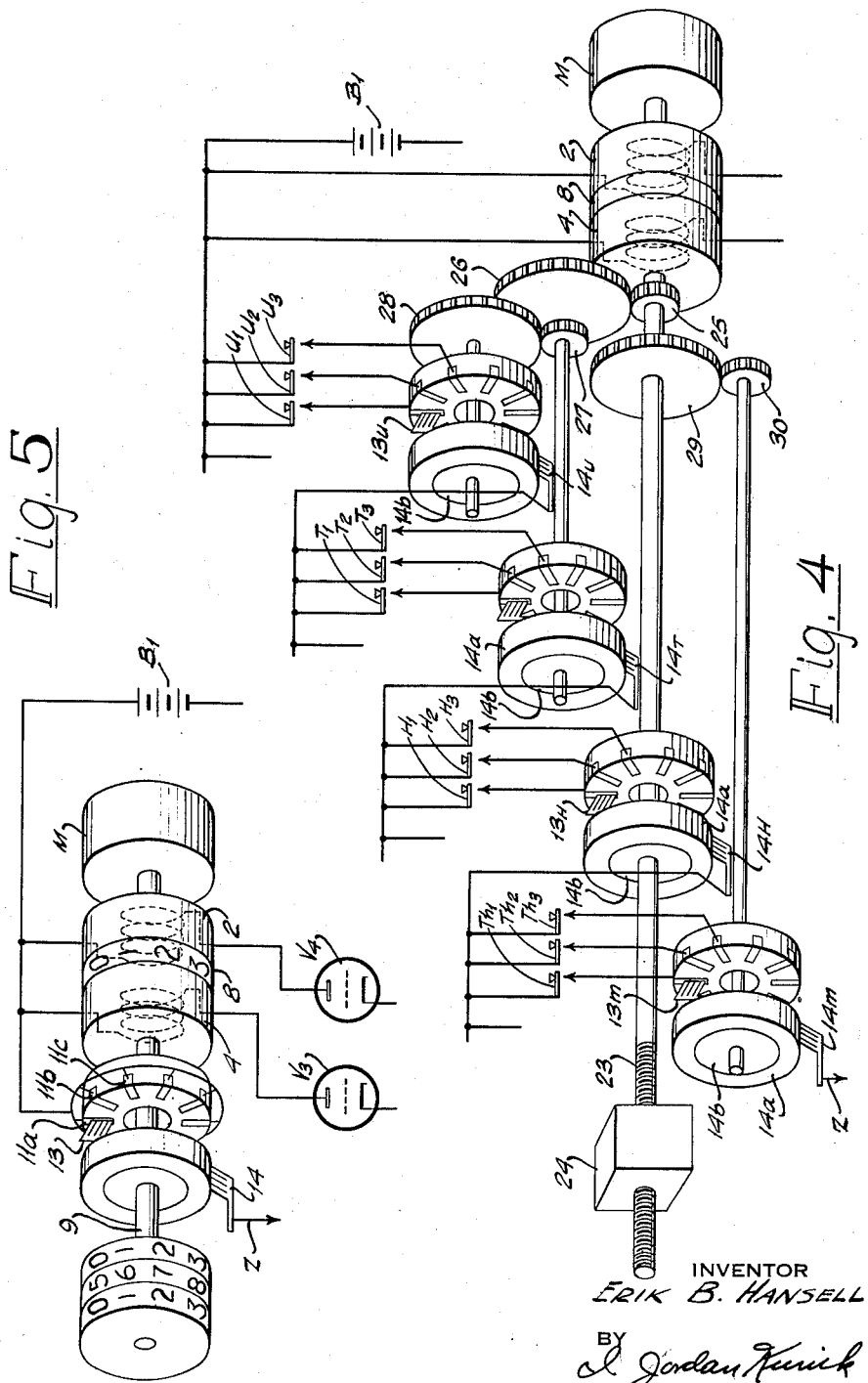

Referring to Fig. 4, there is shown a control arrangement wherein commutator units, as described and shown in Figs. 1 and 2, are cascaded in 1 to 10 ratio to control various machine operations.

Only a portion of the circuit is shown as everything else is similar to Fig. 3. Coupled to the shaft 9 is a screw thread 23 which produces rectilinear motion to carriage 24 to the left or right depending on what direction motor M is turning. Now, as an example, if there are 10 threads per inch on this screw, then one complete turn of shaft 9 will advance carriage 24 a distance of one tenth of an inch. If there are 10 commutator segments $11a$, $11b$, etc. equidistantly spaced around the main shaft 9, as in unit H, then the travel of brush 13 from segment to segment will advance the carriage $1/100$ of an inch. If shaft 9 is coupled to a second commutator unit T (a duplication of the commutator unit shown in Figs. 1 and 2) by means of a 1 to 10 ratio of gears 25 and 26, then the distance from segment to segment will represent a carriage progression of $\frac{1}{1000}$ of an inch. Similarly another step down ratio of 1 to 10 (gears 27 and 28) for unit U will mean a progression of the carriage of one inch from segment to segment. A step up ratio of 10 to 1 from the main shaft, gears 29 and 30, will handle a thousandth of an inch progression of the carriage from segment to segment in unit Th. All four units are connected in cascade so that the wiper brush of each section must contact a segment before a pulse can form at Z. To obtain this condition the segments of the U section must be wide enough to allow the wiper brush of section T to make a complete revolution before breaking contact. This condition must also hold between T and H and between H and Th. In this manner, by depressing four switches, one from each section, simultaneously the carriage can be made to move forward three decimal points. As an example take 2.735 inches from a reference point. The switches depressed are $U_2$, $T_7$, $H_3$ and $Th_5$.

It is to be noted that insulator sections $14b$ are provided in each of the commutator shafts for mounting slip rings $14a$ and also to prevent unwanted currents from reaching the armature 8 and yokes 2 and 4.

It is to be understood that the same circuitry shown in Fig. 3 also applies in Fig. 4 but has been left out in the interest of clarity. It is further assumed that just before starting that all the brushes $13u$, $13t$, $13h$, and $13m$, along with carriage 24 remain stationary at some reference point. The armature 8 also remains in a stationary position. As in Fig. 3, a starting pulse is generated either in conjunction with the switches Th, H, T and U or by a separate starting switch. Since this action is identical to that of Fig. 3, it too has been left out.

The instant a starting pulse is received by the system, the rotating yoke 2 is energized and the stationary yoke 4 deenergized. This starts the armature 8 rotating and with it the shaft 9 which connects to the feed screw 23 which in turn causes the carriage 24 to advance away from the reference point. As soon as the various brushes 13 have reached the different contact segments that correspond to the chosen amount of travel of the carriage 24, the electrical path can be traced as follows: Assuming the case where the carriage travels 2.735 inches, electrical continuity is formed by current coming from the battery $B_1$ which then goes through the switch $U_2$, then down into its brush segment and into the brush $13_U$, up to the switch $T_7$ then down into its brush segment and into the brush $13_T$, up to the switch $H_3$ then down into its brush segment and into the brush $13_H$, up to the switch $Th_5$ then down into its brush segment and into the brush $13_m$. From here it goes down to point Z where the same square wave appears as in Fig. 3. Also as in Fig. 3, this square wave is converted into a stop pulse.

The usefulness of this device becomes apparent when a punched card is used to actuate the switches. In this case a multiplicity of hair springs can be used as switches to make electrical contact through the holes. The amount of tool feed of a tool machine, for instance, can be controlled by the combination of holes punched.

Another way that Fig. 4 may operate is to arrange the groups of keys in parallel instead of in series. Thus, the brushes $13_m$, $13_H$, $13_T$ and $13_U$ can all connect together and come to point Z as a common junction. The upper ends of the switches $Th$, $H$, $T$ and $U$ are also connected together and brought to the battery source $B_1$. This arrangement will permit only one key at a time to be pressed. Thus, in the example above where 2.735 inches of travel is required, the key $U_2$ is first depressed and kept there until the carriage has moved two inches. After releasing this key, the next key $T_7$ is depressed. The carriage now moves $\frac{7}{10}$ inch further. The key $H_3$ is next depressed causing the carriage to move $3/100$ of an inch still farther. This process is continued until the carriage has moved the full 2.735 inches. This kind of control may be useful for very large machine tools where feed translations are controlled by push buttons rather than by the turning of heavy cranks.

In the above-described tool control an arbitrary reference point was established before the tool, mounted on the movable carriage had reached the work. In the following description, the reference point is established the instant the tool touches the work by electrical contact. Furthermore, the commutators U, T, H, and $Th$, do not start counting until the tool actually starts cutting. Then when the cut has arrived to the predetermined depth established by depression of buttons or by punched cards, the feed will automatically stop.

Referring to Fig. 7, 52 is a clutch motor drive assembly that simultaneously turns the feed screw and the rotating yoke 2 of a second clutch assembly 51. The latter along with the commutators U, T, H, and $Th$, is the same as shown in Fig. 4. Attached to carriage 24 is the tool 53 which is electrically insulated from the rest of the machine by non-conductive segment 45, but which is electrically connected as a start pulse source to point E by suitable brush means. Point E is the same as shown in Fig. 3 as is the rest of the circuitry within box 50. In a similar manner the output from the commutators U, T, H, and $Th$ is connected as a stop pulse source to a circuit within box 49 as in Fig. 3.

It is assumed that initially the brushes $13_u$, $13_t$, etc. are positioned at zero with respect to the commutators U, T, H, and $Th$. Also, the tool 53 still has not been advanced to the work piece 54. The clutch drive 52 is first engaged by impressing a start pulse by depressing key 17 to the circuit in box 49. This starts feed screw 23 rotating, thus causing carriage 24 to advance to the left. The commutator sections U, T, H, and $Th$, remain inactive since clutch 51 has not yet been activated. The instant tool 53 touches work 54, electric contact is established between the battery source $B_1$ and the circuit within box 50. This generates a start pulse that immediately starts the action of clutch 51, thus causing the commutator system to operate. Now, as an example, if keys $U_2$, $T_7$, $H_3$, and $Th_5$ are depressed, the tool will progress 2.735 inches when a stop pulse will be generated through the battery $B_1$, the commutators, and the circuitry in box 49 in a manner similar to the operation of Fig. 4. This instantly stops the action of clutch 52 and tool 53 thereby stops its feed.

In order to back the tool off, the motor M may be reversed while clutch assembly 52 is reengaged. The brushes 13 are also brought to zero position of the commutator segments. The various return functions mentioned here may be done automatically by electronic or by mechanical means.

A useful application of this form of control is in advancing the various tool positions of a turret lathe, thus simulating an automatic screw cutting machine.

The visual pulse counting arrangement is shown in Fig. 5 where commutator segments $11a$, $11b$, etc. arranged symmetrically around shaft 9 are all tied together instead of being tied to separate switches. In this way a stop pulse will be generated at grid $g1$ (Fig. 3) every time the wiper brush 13 makes contact with a segment. Now if numbers are placed around the periphery of the armature 8 to correspond to the stop positions, a high speed counter results. Any positive pulse coming in at grid $g2$ (or negative pulse at grid $g1$) will be counted by virtue of the fact that the armature will start rotating and stop at the next number position. A mechanical rotary counter of conventional type may be attached to the shaft 9 to count summations of rotations of the armature in tens, hundreds, thousands, and so on.

The circuitry used for the counting mechanism shown in Fig. 5 is the same as that of Fig. 3. The tube $V_6$ may be omitted if pulse forming is not required. The pulses to be counted come in to $g2$ at Y and turn tube $V_2$ on. This energizes yoke 2 and deenergizes yoke 4 by the same sequences as previously explained. The armature 8 and shaft 9 start rotating. However, brush 13 which turns with the shaft cannot go very far before it touches one of the commutator segments ($11a$, $11b$, $11c$, etc.). Since these are all connected in parallel to the common junction at Z the very next segment reached will generate a stop pulse. This stops the armature 8, and shaft 9, thereby leaving the unit ready to operate in a similar manner for the next pulse coming in at Y. If there are ten commutator segments $11a$, $11b$, $11c$, etc., then for every pulse arriving, the armature will go around an additional $\frac{1}{10}$ of a revolution. The segments being tied together permit armature 8 to advance only $\frac{1}{16}$ of a revolution per pulse to be counted.

Any pulse course, whether derived from mechanical, electrical or electronic sources, may be hooked up with this type of counter for recording totals of received pulses.

An example is a phototube which will transform light fluctuations into countable pulses. As a matter of fact, any electronic transducer will do, such as a crystal, a microphone, etc. In most cases the resulting pulses must go through a pulse forming network as shown.

The mechanism described in Fig. 4 may be adapted with minor modifications to be used as a direct-reading gauge as shown in Fig. 6. Utilizing the magnetic clutch and electronic circuitry described in Fig. 3, the counter mechanism 41 is directly coupled by gears 42 and 43 to shaft 9. Carriage 24, illustrated diagrammatically, is propelled on shaft 9 by the rotation of screw 23. Attached to carriage 24 is a gauge spindle 44 which is electrically insulated from the rest of the machine by non-conductive segment 45, but which is electrically connected to point Z by suitable brush means. Although the electronic circuitry and principle of operation is the same as that described in Fig. 3, it is to be noted that only one starting switch-condenser-resistor combination ($17_1$, $C_2$, $R_{11}$) is required. Anvil 46 of the gauge is connected to battery $B_1$.

The operation of the gauge embodiment of my invention comprises the following: The object 47 to be measured, and consisting of conductive material, whose dimension X is to be measured is placed on anvil 46. By closing switch $17_1$, a start pulse is generated, as previously described, which causes shaft 9 to rotate, which in turn causes counter 41 to count and spindle 44 to advance toward object 47. The instant spindle 44 touches object 47, a stop pulse is generated through point Z which instantly disengages the magnetic clutch causing shaft 9 to stop along with carriage 24, spindle 44 and counter 41. At the moment of stopping, the counter indicates the number of rotations through which shaft 9 has turned and when the gear and thread relationships are known or predetermined, an exact measurement of object 47 is easily and quickly calculated.

The counter can be arranged to run backwards so as to subtract rather than to add, so that when a reference point is established such as 2.000 inches and .439, for instance, is subtracted on the counter, a final direct reading of 1.561 inches for the dimension of the object will be indicated by the counter.

The counter can be checked and calibrated by running spindle 44 to anvil 46 at which point the counter should read 0.000. No back-lash problems are encountered because the spindle and counter always travel in one direction on the measuring stroke.

In the event that the object to be measured is a non-conductor, a conductive shim of known thickness may be placed on the spindle side of the object. This shim in turn is electrically connected to the anvil, thereby making the required contact with the spindle.

The mechanism of the present invention can be adapted to various kinds of computing requirements. The contact segments $11_a$, $11_b$, etc. in the commutator may be distributed in a non-uniform array. In this manner the counter can function as a type of calculator with, for example, a logarithmic spacing of segments or with other spatial arrangements as required by predetermined mathematical relationships or formulas. It is also possible to arrange the segments in a non-uniform or irregular array for machine control purposes where that may be required.

While the present invention, as to its objects and advantages, has been described herein as carried out in specific embodiments thereof, it is not desired to be limited thereby, but it is intended to cover the invention broadly within the spirit and scope of the appended claims.

I claim:

1. A device for controlling angular rotation comprising a drive shaft, a motor drive for said shaft, a rotatable magnetic yoke attached to said shaft, a driven shaft, a second stationary magnetic yoke surrounding said driven shaft, a magnetizable armature attached to said second shaft and positioned between said magnetic yokes, a stationary commutator positioned around said driven shaft, a plurality of conductive segments positioned in a circle around said commutator, a switch connected to each of said segments, a brush for contacting said segments fixed to and rotated by said driven shaft, and an electronic pulse-triggering circuit connected to said brush, said circuit being in turn connected to said magnetic yokes and being adapted to energize either of said yokes one at a time.

2. A device according to claim 1, and further comprising a carriage connected to said driven shaft, means connected between said carriage and said driven shaft to produce rectilinear motion on said carriage, a plurality of units each comprising a commutator, a plurality of segments on said commutator, a brush for contacting said segments and a set of switches connected to said brush, said units being geared in cascaded relation to said driven shaft, each of said switches being connected to a common power source on one side and to the commutator segments on the other side, said segments being wiped by brushes that are tied together in parallel.

3. A device according to claim 1, in which said pulse-triggering circuit consists of a flip-flop circuit comprising two trigger tubes, the first of said tubes being electrically connected to the rotatable yoke and the second tube being electrically connected to the stationary yoke, a rectifier tube electrically connected between said brush and said second trigger tube, a rectifier tube electrically connected between said switches and said first trigger tube, a pulse differentiating circuit connected between each of said switches and said first trigger tube, and a second pulse differentiating circuit connected between said brush and said second trigger tube.

4. A device according to claim 3, and further comprising amplifier tubes electrically connected between each trigger tube and its respective yoke.

5. A device according to claim 1, and further comprising a carriage connected to said driven shaft, means connected between said carriage and said driven shaft to produce rectilinear motion on said carriage, a plurality of units each comprising a commutator, a plurality of segments on said commutator, a brush for contacting said segments and a set of switches connected to said brush, said units being geared in cascaded relation to said driven shaft, each set of switches being connected between segments of one unit and the brush of another adjacent unit.

6. A device according to claim 5, in which each unit bears a proportional relationship to the next unit whereby each unit is capable of controlling the rotation of said driven shaft to a predetermined degree.

7. A device according to claim 6, in which each unit is geared in a predetermined relationship to said driven shaft.

8. A device for controlling the rectilinear motion of a tool comprising a shaft, a motor, a magnetic clutch connected between said motor and said shaft, a tool carriage coupled to said shaft, the rotation of said shaft providing rectilinear motion to said carriage, a tool attached to and insulated from said carriage, a start-stop pulse circuit connected to said magnetic clutch, a work piece electrically connected to a power source, a second magnetic clutch connected to said shaft, a second start-stop pulse circuit electrically connected between said second magnetic clutch and said tool, a plurality of commutator units coupled to said second magnetic clutch, said units each comprising a commutator, a plurality of segments arranged uniformly around said commutator, a brush for contacting said segments and a set of switches connected to said segments, said units being geared in cascaded relation to said shaft, each set of switches being connected between segments of one unit and the brush of another adjacent unit, the switches of the first unit being connected to a power source, the first start-stop pulse circuit being connected between the first magnetic clutch and the last commutator unit.

9. A device according to claim 8, in which each start-stop pulse circuit consists of a trigger circuit comprising two trigger tubes, one of said tubes being connected to the rotatable yoke and the other tube being connected to the stationary yoke, a rectifier tube connected to each of said trigger tubes, a pulse differentiating circuit connected between said switches and one of said trigger tubes, and a second pulse differentiating circuit connected between said brush and the other trigger tube.

10. A device according to claim 9, in which each of said commutator units bears a similar proportional relationship to the next adjacent commutator unit.

11. A device according to claim 10, wherein electrical contact is established between said tool and said work piece after initial rectilinear motion of said carriage has caused said tool and said work piece to meet, the resultant electric pulse causing the activation of said second clutch, said second clutch engaging said cascaded commutator segments, said commutator segments when arriving in proper relation to said switches causing a pulse then to activate said first clutch to cause immediate stopping of rectilinear motion of said carriage and tool.

12. A device according to claim 11, in which said sets of switches are actuated through holes in a punched card.

13. A device for controlling angular rotation of a driven shaft, comprising a drive shaft, a motor drive for said shaft, a rotatable magnetic yoke attached to and rotating with said drive shaft, a driven shaft, a second stationary magnetic yoke surrounding said driven shaft, a magnetizable armature attached to said driven shaft and positioned between said magnetic yokes, a stationary commutator positioned around said driven shaft, a plurality of conductive segments positioned in a circle around said commutator, a switch connected to each of said segments, a brush attached to said driven shaft for contacting said segments successively, an electromagnetic relay electrically connected to said brush, an arm connected to and operated by said relay, two contacts, one of said contacts being electrically connected to the rotatable magnetic yoke, the other of said contacts being electrically connected to the stationary yoke, said arm being adapted to contact said contacts alternately, and a power source electrically connecting said relay and said arm to both of said yokes, said switches each being electrically connected to said power source.

ERIK B. HANSELL.

References Cited in the file of this patent

UNITED STATES PATENTS

| Number | Name | Date |
| --- | --- | --- |
| 1,155,124 | Berger | Sept. 28, 1915 |
| 1,274,698 | Edgecomb | Aug. 6, 1918 |
| 1,593,164 | Ehrhart | July 20, 1926 |
| 2,018,720 | Hodgson | Oct. 29, 1935 |
| 2,034,708 | Browne et al. | Mar. 24, 1936 |
| 2,085,442 | Newell | June 29, 1937 |
| 2,104,200 | Kopp | Jan. 4, 1938 |
| 2,295,968 | Poole | Sept. 15, 1942 |
| 2,311,142 | Turrettini | Feb. 16, 1943 |
| 2,368,408 | Brooking | Jan. 30, 1945 |
| 2,396,497 | Eisenberg | Mar. 12, 1946 |
| 2,398,519 | Clark | Apr. 16, 1946 |
| 2,413,211 | Brian | Dec. 24, 1946 |
| 2,417,148 | Wright | Mar. 11, 1947 |
| 2,425,124 | Ray | Aug. 5, 1947 |
| 2,428,017 | Devaux | Sept. 30, 1947 |
| 2,481,333 | Bickel et al. | Sept. 6, 1949 |
| 2,487,469 | Nelson | Nov. 8, 1949 |
| 2,488,696 | Waldron | Nov. 22, 1949 |
| 2,489,203 | Siekmann et al. | Nov. 22, 1949 |